No. 712,066. Patented Oct. 28, 1902.
DE KERNIEA J. T. HIETT.
TABULATING MECHANISM.
(Application filed Feb. 24, 1902.)

(No Model.) 3 Sheets—Sheet 1.

Witnesses,
Inventor,

No. 712,066. Patented Oct. 28, 1902.
DE KERNIEA J. T. HIETT.
TABULATING MECHANISM.
(Application filed Feb. 24, 1902.)
(No Model.) 3 Sheets—Sheet 2.

Witnesses. Inventor,
De Kerniea J. T. Hiett,
By Offield Towle & Linthicum,
Att'ys.

No. 712,066. Patented Oct. 28, 1902.
DE KERNIEA J. T. HIETT.
TABULATING MECHANISM.
(Application filed Feb. 24, 1902.)
(No Model.) 3 Sheets—Sheet 3.
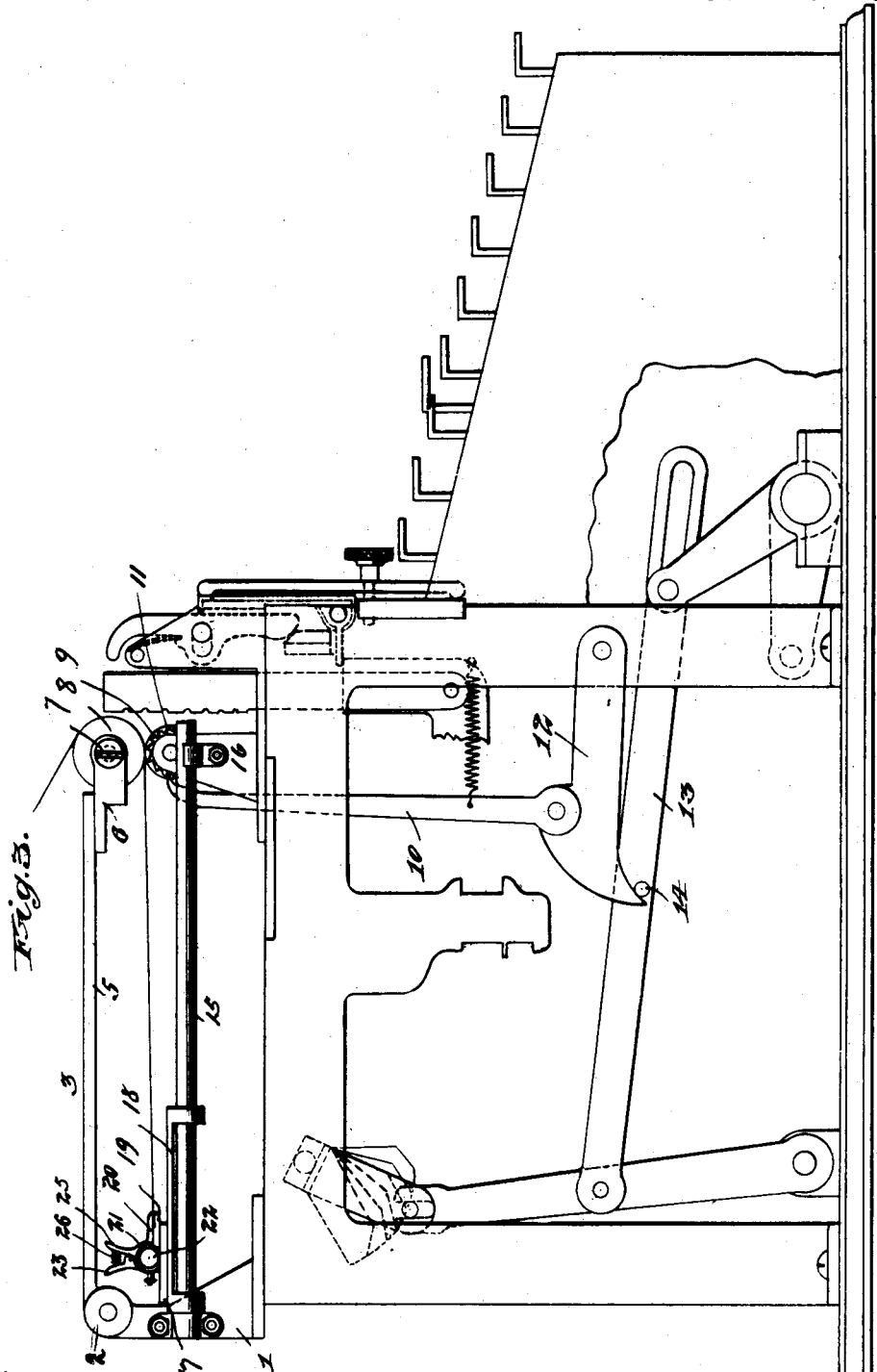

UNITED STATES PATENT OFFICE.

DE KERNIEA J. T. HIETT, OF ST. LOUIS, MISSOURI, ASSIGNOR OF THIRTEEN TWENTY-FIFTHS TO GUSTAVUS A. VON BRECHT, OF ST. LOUIS, MISSOURI.

TABULATING MECHANISM.

SPECIFICATION forming part of Letters Patent No. 712,066, dated October 28, 1902.

Application filed February 24, 1902. Serial No. 95,345. (No model.)

*To all whom it may concern:*

Be it known that I, DE KERNIEA J. T. HIETT, a citizen of the United States, residing at St. Louis, in the State of Missouri, have invented certain new and useful Improvements in Tabulating Mechanism, of which the following is a full, clear, and exact specification.

This invention relates to improvements in tabulating mechanisms for use in connection with calculating-machines and machines of analogous character; and the object of the invention is to provide a simple sheet holding and adjusting mechanism whereby the operator may arrange printed matter in tabulated form.

To this end the invention consists in the matters hereinafter described, and more particularly pointed out in the appended claims, and the same will be readily understood from the following description, reference being had to the accompanying drawings, forming a part thereof, and in which—

Figure 1:
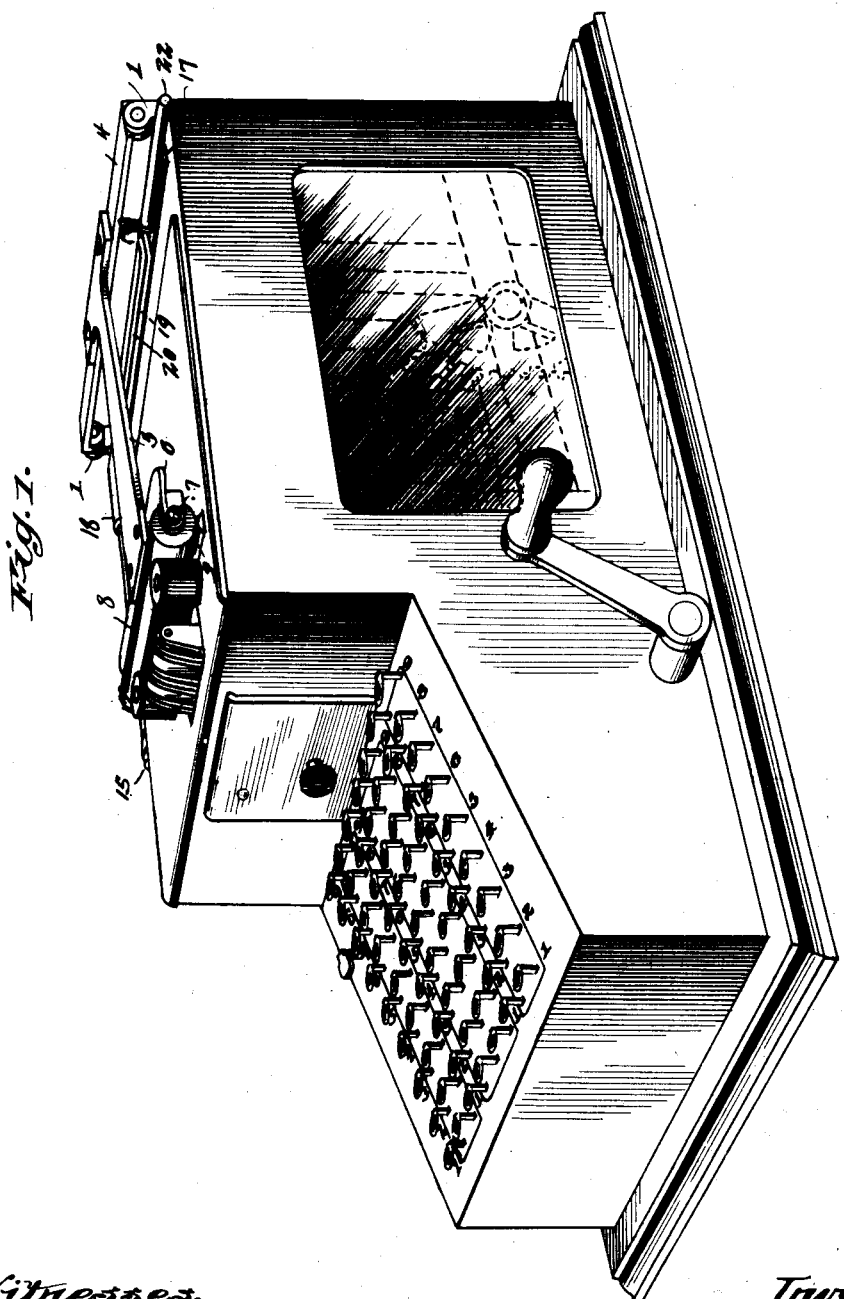
Figure 2:
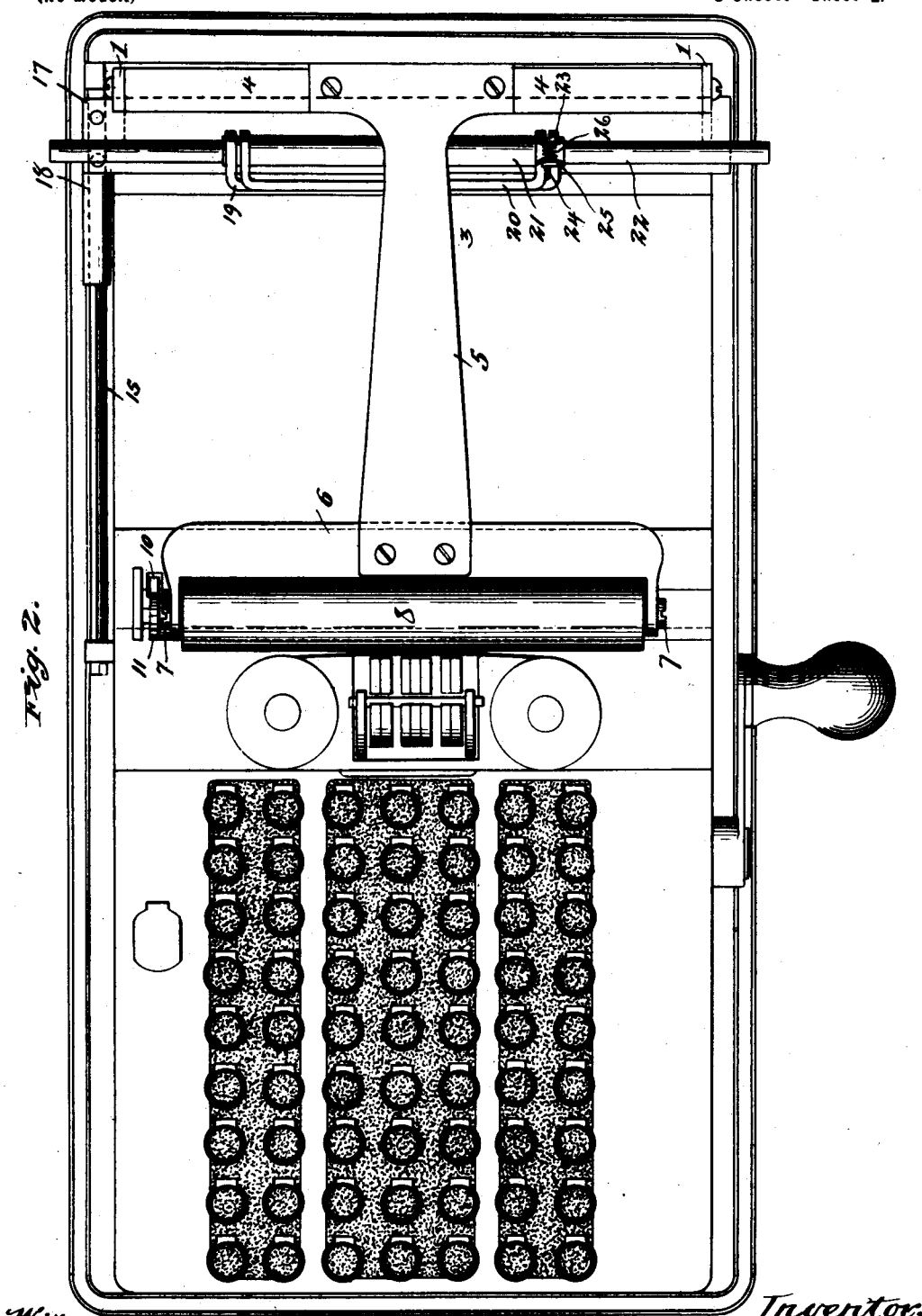

Figure 1 is a perspective view of an adding-machine equipped with my improved tabulating mechanism. Fig. 2 is a plan view, and Fig. 3 is a side elevation, of the machine shown in Fig. 1.

Referring to the said figures, 1 designates a pair of brackets mounted at the rear part of the main frame in vertical and parallel relation and provided at their upper ends with suitable bearing members 2, whereon is pivotally mounted a vibrating frame 3 upon a transverse axis, said frame in the present instance being of skeleton form and consisting of a transverse member 4, which forms the axial portion of the frame, a central arm-like member 5, and a platen-support, (designated as a whole 6,) and comprising bracket-like extensions connected with the forward end of the arm 5 and supporting the trunnions 7 of the platen 8.

Immediately subjacent the platen is arranged the feed-roller 9, which may be actuated in any suitable manner to feed the paper between the roller and the superposed platen, said feed-roller being in the present instance actuated by means of a pawl 10, acting upon a ratchet 11 upon one end of the feed-roller. The pawl 10 is in the form of an arm, which extends downwardly to and is connected with a cam-lever 12, which is in turn actuated by a reciprocatory bar 13, carrying a cam-stud 14.

At one side of the tabulating structure, preferably at the left-hand side of the machine, is mounted to extend a longitudinally-disposed guide-bar or support 15, which is conveniently attached rigidly to one of the brackets 1 at its rear end and to the corresponding bracket 16, which supports the feed-roll, at its forward end. Upon the guide-bar 15 is arranged to slide a clip mechanism, which comprises a transversely-extending supporting-bar 17, provided with an L-shaped extension 18, which is provided with bearing-apertures and embraces the guide-bar 15 at longitudinally-separated points, so as to insure exact transverse alinement of the supporting-bar as a whole.

Upon the support 17 is mounted the clip proper, which comprises a relatively fixed lower jaw member 19 and an upper movable jaw member 20, arranged to coöperate therewith and held in spring-pressed engagement with the lower jaw.

In the preferred construction shown herein the lower jaw member 19 is connected or formed integrally with a sleeve-like member 21, which is in turn mounted to reciprocate and slide upon a rod-like support 22, mounted to extend longitudinally of the base-bar 17, it being understood that the upper member 21 is longitudinally slotted at its lower side, so that the clip as a whole may reciprocate some distance beyond the ends of the rod-like support without becoming disengaged therefrom. The lower jaw member is also provided at its upper side with an extension 23, which both serves as a handle or finger-piece and also as a support for the lower ends of a spring to be hereinafter described. The upper jaw member comprises a jaw portion proper, provided at each end with an ear or eye member 24, which are journaled upon the sleeve-like member 21 of the lower jaw. The upper jaw is also provided at one end or other convenient point with a handle or finger-piece 25, and between this and the subjacent extension 23 of the lower jaw is interposed a coiled expansion-spring 26.

The operation of the apparatus constructed as described is probably entirely obvious, but may be briefly stated as follows: The upper vibrating frame carrying the platen is lifted up and the back edge of the sheet or recording-strip inserted between the jaws of the strip, the latter being opened by bringing the finger portions thereof together and the clip as a whole adjusted transversely to bring the desired portion of the recording sheet or strip opposite the printing-point. The recording-sheet is then extended out between the feed-roller and platen and the vibrating frame carrying the platen lowered into bearing with the feed-roller, whereupon the operation of the machine operates to throw the clip forwardly with the sheet of paper as the latter is fed step by step. Having thus formed one column, the operator can now form a second column parallel with the first by simply lifting the vibrating frame to release the sheet of paper, shifting the clip back to the rear end of its guide, and adjusting it laterally to bring the new space whereon the second column is to be printed in alinement with the printing-points. Obviously the sheet of paper can be instantly adjusted either laterally or longitudinally to any desired point without the movement of the feeding mechanism or operating parts of the machine.

It will be seen from the foregoing that a device embodying my invention is extremely simple and practical, that it may be constructed at a minimum expense, and has no parts which are at all likely to get out of order or repair.

It will be obvious that the detail of construction may be modified and auxiliary features added to the features shown and described herein for the purpose of effecting certain parts of the operation automatically, and I do not, therefore, limit myself to the details shown and described herein except to the extent that the same are made the subject of specific claims.

I claim as my invention—

1. In a tabulating mechanism, the combination of a longitudinally-extending guide, a transversely-extending frame member mounted to reciprocate upon said guide, a clip carried by said transverse frame member, and means for confining a recording-sheet located at one end of said longitudinally-disposed guide.

2. In a tabulating mechanism, the combination of a longitudinally-extending guide, a sliding frame mounted to reciprocate upon said guide and extending transversely thereto, a clip mounted upon said sliding frame, a feed-roller located at one end of said guide, and a coöperating platen, said clip being movably mounted upon said sliding frame.

3. In a tabulating mechanism, the combination with a longitudinally-extending guide, a sliding frame mounted to reciprocate thereon and extending transversely thereto, a guide upon said sliding frame also extending transversely to the main guide, a clip mounted to slide upon said sliding-frame guide, and means for feeding a recording-sheet arranged to coöperate therewith.

4. In a tabulating mechanism, the combination with a longitudinally-extending fixed guide member, of a supporting-frame arranged to slide upon said fixed guide and extending transversely of the machine, a guide-bar fixed upon said sliding frame to extend transversely of the machine, a sheet-holding clip comprising spring-pressed jaw members mounted to reciprocate upon said transverse guide-bar, a vibrating frame pivotally mounted to extend above said clip, a paper-supporting roller journaled at the end of said vibrating frame remote from its pivotal support, and a coöperating roller journaled in fixed supports subjacent thereto, and means for actuating one of said rollers.

DE KERNIEA J. T. HIETT.

Witnesses:
FREDERICK C. GOODWIN,
SAMUEL N. POND.